(12) United States Patent
Yamazaki et al.

(10) Patent No.: US 10,167,418 B2
(45) Date of Patent: Jan. 1, 2019

(54) HOT MELT SILICONE AND CURABLE HOT MELT COMPOSITION

(71) Applicant: Dow Corning Toray Co., Ltd., Tokyo (JP)

(72) Inventors: Haruna Yamazaki, Ichihara (JP); Makoto Yoshitake, Ichihara (JP); Ryosuke Yamazaki, Ichihara (JP)

(73) Assignee: Dow Corning Co., Ltd., Tokyo (JP)

( * ) Notice: Subject to any disclaimer, the term of this patent is extended or adjusted under 35 U.S.C. 154(b) by 80 days.

(21) Appl. No.: 15/320,513

(22) PCT Filed: Jun. 16, 2015

(86) PCT No.: PCT/JP2015/002990
§ 371 (c)(1),
(2) Date: Dec. 20, 2016

(87) PCT Pub. No.: WO2015/194158
PCT Pub. Date: Dec. 23, 2015

(65) Prior Publication Data
US 2018/0208816 A1 Jul. 26, 2018

(30) Foreign Application Priority Data

Jun. 20, 2014 (JP) ................................. 2014-127674

(51) Int. Cl.
| | | |
|---|---|---|
| C09J 183/04 | (2006.01) |
| C09J 11/00 | (2006.01) |
| C08G 77/12 | (2006.01) |
| C08G 77/16 | (2006.01) |
| C08K 3/22 | (2006.01) |
| C08K 5/5419 | (2006.01) |
| C08K 5/56 | (2006.01) |
| C08L 83/04 | (2006.01) |
| C09D 183/04 | (2006.01) |
| C08L 83/00 | (2006.01) |
| C08G 77/18 | (2006.01) |
| C08G 77/20 | (2006.01) |
| C08G 77/00 | (2006.01) |

(52) U.S. Cl.
CPC ............ *C09J 183/04* (2013.01); *C08G 77/12* (2013.01); *C08G 77/16* (2013.01); *C08K 3/22* (2013.01); *C08K 5/5419* (2013.01); *C08K 5/56* (2013.01); *C08L 83/00* (2013.01); *C08L 83/04* (2013.01); *C09D 183/04* (2013.01); *C09J 11/00* (2013.01); *C08G 77/18* (2013.01); *C08G 77/20* (2013.01); *C08G 77/80* (2013.01)

(58) Field of Classification Search
CPC .......... C08G 77/12; C08G 77/20; C08G 77/80
See application file for complete search history.

(56) References Cited

U.S. PATENT DOCUMENTS

| | | | |
|---|---|---|---|
| 5,162,410 A | 11/1992 | Sweet | |
| 7,138,467 B2 | 11/2006 | Furukawa et al. | |
| 7,858,198 B2 | 12/2010 | Kashiwagi et al. | |
| 8,178,642 B2 | 5/2012 | Morita et al. | |
| 8,895,678 B2 | 11/2014 | Yoshitake | |
| 9,045,667 B2 | 6/2015 | Hirai et al. | |
| 2004/0116640 A1 | 6/2004 | Miyoshi | |
| 2005/0080204 A1 | 4/2005 | Furukawa et al. | |
| 2011/0160410 A1 | 6/2011 | Sagawa et al. | |
| 2011/0248312 A1 | 10/2011 | Katayama | |
| 2014/0088232 A1 | 3/2014 | Mochizuki et al. | |
| 2014/0221581 A1* | 8/2014 | Yoshitake .............. C08G 77/38 525/477 |
| 2014/0377570 A1 | 12/2014 | Hirai et al. | |

FOREIGN PATENT DOCUMENTS

| | | |
|---|---|---|
| AT | 409208 T | 10/2008 |
| AU | 2003208009 A1 | 9/2003 |
| CA | 2 038 902 A1 | 10/1991 |
| CN | 103582679 A | 2/2014 |
| CN | 103797049 A | 5/2014 |
| EP | 0 452 034 A2 | 10/1991 |
| EP | 1 478 695 A | 9/2003 |
| EP | 2 721 108 A | 12/2012 |
| EP | 2 756 027 A | 3/2013 |
| FI | 911803 A | 10/1991 |
| IE | 911111 A | 10/1991 |
| JP | H 05-86351 A | 4/1993 |
| JP | 2003-253122 A | 9/2003 |
| JP | 2004-186168 A | 7/2004 |
| JP | 2009-235368 A | 10/2009 |
| JP | 2009-242627 A | 10/2009 |

(Continued)

OTHER PUBLICATIONS

International Search Report for Application No. PCT/JP2015/002990 dated Jul. 14, 2015, 5 pages.

(Continued)

*Primary Examiner* — Kuo Liang Peng
(74) *Attorney, Agent, or Firm* — Howard & Howard Attorneys PLLC

(57) ABSTRACT

A hot melt silicone that is non-flowable at 25° C. and that has a melt viscosity at 100° C. of 5,000 Pa·s or less, the hot melt silicone being formed by subjecting (A) an alkenyl group-containing organopolysiloxane in which 10 mol % or greater of all of silicon atom-bonded organic groups is a phenyl group, and (B) an organopolysiloxane having at least two silicon atom-bonded hydrogen atoms in a molecule to hydrosilylation reaction in the presence of (C) a hydrosilylation reaction catalyst; and a curable hot melt composition comprising: (I) the hot melt silicone; (II) an organopolysiloxane which has at least two silicon atom-bonded hydrogen atoms in a molecule and in which the amount of silicon atom-bonded hydrogen atom is 0.5 mass % or greater; and (III) a hydrosilylation reaction catalyst. The hot melt silicone is non-flowable at 25° C., has a low surface stickiness, and easily melts by heating. Furthermore, this curable hot melt composition has both hot melt properties and curability.

9 Claims, No Drawings

(56) References Cited

FOREIGN PATENT DOCUMENTS

| JP | 2011-219597 | A | | 11/2011 |
|----|----|----|----|----|
| JP | 2013001794 | A | | 1/2013 |
| JP | 2013-076050 | A | | 4/2013 |
| KR | 10-2014-0043744 | A | | 4/2014 |
| KR | 10-2014-0063778 | A | | 5/2014 |
| TW | 201307480 | A | | 2/2013 |
| TW | 201315773 | A | | 4/2013 |
| WO | WO 03-072656 | A1 | | 9/2003 |
| WO | 2012 173167 | | * | 12/2012 |
| WO | WO 2012/173167 | A1 | | 12/2012 |
| WO | WO 2013/039265 | A1 | | 3/2013 |

OTHER PUBLICATIONS

English language abstract for AT 409208 extracted from espacenet.com database on Dec. 21, 2016, 1 page.
English language abstract for CN 103582679 extracted from espacenet.com database on Dec. 21, 2016, 1 page.
English language abstract for CN 103797049 extracted from espacenet.com database on Dec. 21, 2016, 1 page.
English language abstract not found for FI 911803; however, see English language equivalent U.S. Pat. No. 5,162,410. Original document extracted from espacenet.com database on Dec. 21, 2016, 1 page.
English language abstract not found for JPH 05-86351; however, see English language equivalent U.S. Pat. No. 5,162,410. Original document extracted from espacenet.com database on Dec. 21, 2016, 11 pages.
English language abstract for JP 2003-253122 extracted from espacenet.com database on Dec. 21, 2016, 2 pages.
English language abstract for JP 2004-186168 extracted from espacenet.com database on Dec. 21, 2016, 1 page.
English language abstract for JP 2009-235368 extracted from espacenet.com database on Dec. 21, 2016, 1 page.
English language abstract for JP 2009-242627 extracted from espacenet.com database on Dec. 21, 2016, 2 pages.
English language abstract for JP 2011-219597 extracted from espacenet.com database on Dec. 21, 2016, 1 page.
English language abstract for JP 2013-001794 extracted from espacenet.com database on Dec. 21, 2016, 2 pages.
English language abstract for JP 2013-076050 extracted from espacenet.com database on Dec. 21, 2016, 2 pages.
English language abstract not found for KR 10-2014-0043744; however, see English language equivalent U.S. Pat. No. 8,895,678. Original document extracted from espacenet.com database on Dec. 21, 2016, 8 pages.
English language abstract not found for KR 10-2014-0063778; however, see English language equivalent U.S. Pat. No. 9,045,667. Original document extracted from espacenet.com database on Dec. 21, 2016, 17 pages.
English language abstract for TW 201307480 extracted from espacenet.com database on Dec. 21, 2016, 1 page.
English language abstract for TW 201315773 extracted from espacenet.com database on Dec. 21, 2016, 1 page.

* cited by examiner

HOT MELT SILICONE AND CURABLE HOT MELT COMPOSITION

CROSS-REFERENCE TO RELATED APPLICATIONS

This application is the National Stage of International Patent Application No. PCT/JP2015/002990, filed on Jun. 16, 2015, which claims priority to and all the advantages of Japanese Patent Application No. 2014-127674, filed on Jun 20, 2014, the content of which is incorporated herein by reference.

TECHNICAL FIELD

The present invention relates to a hot melt silicone and a curable hot melt composition containing the silicone.

BACKGROUND ART

Curable silicone compositions have been used in a wide range of industrial fields since these curable silicone compositions cure to form cured products having excellent heat resistance, cold resistance, electrical insulating properties, weatherability, water repellency, and transparency. In particular, the cured products thereof are less likely to be discolored compared to other organic materials, and the cured products cause less degradation of physical properties. Therefore, the cured products are suitable as optical materials. For example, Patent Document 1 proposes a liquid silicone resin composition for light emitting diode (LED) elements, comprising: an alkenyl group-containing silicone resin, a silicon atom-bonded hydrogen atom-containing organopolysiloxane, and a hydrosilylation reaction catalyst.

Meanwhile, materials that are solid or semisolid at room temperature have been proposed for production process for novel LEDs in recent years. For example, Patent Document 2 describes a sheet-like silicone resin composition for light emitting diodes (LEDs), comprising: an alkenyl group-containing silicone resin, a silicon atom-bonded hydrogen atom-containing organopolysiloxane, and a hydrosilylation reaction catalyst. Patent Document 3 describes a curable organopolysiloxane composition comprising: a solvent-soluble alkenyl group-containing organopolysiloxane formed by a hydrosilylation reaction of an alkenyl group-containing organopolysiloxane and a silicon atom-bonded hydrogen atom-containing organopolysiloxane, a silicon atom-bonded hydrogen atom-containing organopolysiloxane, and a hydrosilylation reaction catalyst. Patent Document 4 describes a silicone resin sheet formed by partially curing a silicone resin composition comprising: an organopolysiloxane having at least two alkenylsilyl groups in a molecule, an organopolysiloxane having at least two hydrosilyl groups in a molecule, a hydrosilylation reaction catalyst, and a reaction inhibitor.

However, these materials have problems such as having surface stickiness at 25° C., having insufficient hot melt properties, and being not satisfactory for practical applications.

CITATION LIST

Patent Literature

Patent Document 1: Japanese Unexamined Patent Application Publication No. 2004-186168A Patent Document 2: Japanese Unexamined Patent Application Publication No. 2009-235368A Patent Document 3: Japanese Unexamined Patent Application Publication No. 2009-242627A Patent Document 4: Japanese Unexamined Patent Application Publication No. 2011-219597A

SUMMARY OF INVENTION

Technical Problem

An object of the present invention is to provide a hot melt silicone which is non-flowable at 25° C., has low surface stickiness, and is easily melt by heating. Furthermore, another object of the present invention is to provide a curable hot melt composition that has both hot melt properties and curability.

Solution to Problem

The hot melt silicone of the present invention is a hot melt silicone that is non-flowable at 25° C. and that has a melt viscosity at 100° C. of 5,000 Pa·s or less, the hot melt silicone being formed by subjecting (A) an alkenyl group-containing organopolysiloxane in which 10 mol % or greater of all of silicon atom-bonded organic groups is a phenyl group, and (B) an organopolysiloxane having at least two silicon atom-bonded hydrogen atoms in a molecule, in an amount such that an amount of the silicon atom-bonded hydrogen atoms in the present component is from 0.2 to 0.7 mol per 1 mol of alkenyl group in component (A), to hydrosilylation reaction in the presence of (C) a hydrosilylation reaction catalyst.

Furthermore, the reactive hot melt composition of the present invention comprises: (I) the hot melt silicone described above; (II) an organopolysiloxane which has at least two silicon atom-bonded hydrogen atoms in a molecule and in which an amount of silicon atom-bonded hydrogen atom is 0.5 mass % or greater, in an amount such that an amount of the silicon atom-bonded hydrogen atom in the present component is from 0.1 to 2.0 mol per 1 mol of alkenyl group in component (I); and (III) a hydrosilylation reaction catalyst.

Effects of Invention

The hot melt silicone of the present invention is non-flowable at 25° C., has a low surface stickiness, and easily melts by heating. Furthermore, the curable hot melt composition of the present invention has both hot melt properties and curability.

DETAILED DESCRIPTION OF THE INVENTION

First, the hot melt silicone of the present invention will be described in detail.

The hot melt silicone of the present invention is formed by subjecting (A) an alkenyl group-containing organopolysiloxane in which 10 mol % or greater of all of silicon atom-bonded organic groups is a phenyl group, and (B) an organopolysiloxane having at least two silicon atom-bonded hydrogen atoms in a molecule, to hydrosilylation reaction.

Component (A) is an alkenyl group-containing organopolysiloxane in which 10 mol % or greater, and preferably 20 mol % or greater, of all of silicon atom-bonded organic groups is a phenyl group. This is because, when the content of the phenyl group in component (A) is greater than or equal to the lower limit described above, a hot melt silicone that is non-flowable at 25° C. and has a low surface stickiness can be obtained. Examples of the alkenyl groups in component (A) include alkenyl groups having from 2 to 12 carbons such as vinyl groups, allyl groups, butenyl groups, pentenyl groups, hexenyl groups, heptenyl groups, octenyl groups, nonenyl groups, decenyl groups, undecenyl groups, and dodecenyl groups, and of these, vinyl groups are preferable. Examples of the group bonded to the silicon atom, other than the phenyl group and the alkenyl group, of component (A) include alkyl groups having from 1 to 12 carbons, such as a methyl group, an ethyl group, a propyl group, a butyl group, a pentyl group, a hexyl group, a heptyl group, an octyl group, a nonyl group, a decyl group, an undecyl group, and a dodecyl group; aryl groups having from 7 to 20 carbons, such as a tolyl group, a xylyl group, a naphthyl group, an anthracenyl group, a phenanthryl group, and a pyrenyl group; aralkyl groups having from 7 to 20 carbons, such as a benzyl group, a phenethyl group, a naphthylethyl group, a naphthylpropyl group, an anthracenylethyl group, a phenanthrylethyl group, and a pyrenylethyl group; and groups in which some or all of the hydrogen atoms bonded to these groups are substituted with halogen atoms, such as chlorine atoms and/or bromine atoms.

Although such component (A) is not limited, component (A) is preferably an organopolysiloxane represented by the average composition formula:

$$R^1_a SiO_{(4-a)/2}$$

In the formula, $R^1$ is a halogen-substituted or unsubstituted monovalent hydrocarbon group, and examples thereof include phenyl groups, alkenyl groups, alkyl groups, aryl groups, and aralkyl groups, which are the same as those described above. Of these, a methyl group, a phenyl group, and a vinyl group are preferable. However, 10 mol % or greater, and preferably 20 mol % or greater, of all $R^1$ is a phenyl group, and at least two of $R^1$ are alkenyl groups. This is because, when the content of the phenyl group is greater than or equal to the lower limit described above, a hot melt silicone that is non-flowable at 25° C. and has a low surface stickiness can be obtained.

Furthermore, in the formula, a is a number in a range of 0.5 to 2.5, and preferably a number in a range of 1.0 to 2.0. This is because, when a is greater than or equal to the lower limit of the range described above, a hot melt silicone composition having a low viscosity at high temperatures is obtained, and on the other hand, when a is less than or equal to the upper limit of the range described above, a hot melt silicone composition that is non-flowable at 25° C. and has a low surface stickiness is obtained.

Component (A) is more preferably (A-1) an organopolysiloxane having at least two alkenyl groups in a molecule and represented by the average unit formula:

$$(R^2_3SiO_{1/2})_b(R^2_2SiO_{2/2})_c(R^2SiO_{3/2})_d(SiO_{4/2})_e (R^3O_{1/2})_f$$

or a mixture of component (A-1) and (A-2) an organopolysiloxane having at least two alkenyl groups in a molecule and represented by the average unit formula:

$$(R^4_3SiO_{1/2})_g(R^4_2SiO_{2/2})_h(R^4SiO_{3/2})_i(SiO_{4/2})_j (R^5O_{1/2})_k$$

In component (A-1), in the formula, $R^2$ are the same or different, halogen-substituted or unsubstituted monovalent hydrocarbon groups and examples thereof include the same groups exemplified for $R^1$ described above, and of these, a methyl group, a phenyl group, and a vinyl group are preferable. Furthermore, in the formula, $R^3$ is a hydrogen atom or an alkyl group having from 1 to 6 carbons. Examples of the alkyl group of $R^3$ include a methyl group, an ethyl group, a propyl group, and a butyl group. Of these, a methyl group and an ethyl group are preferable.

Furthermore, in the formula, b is a number in a range of 0 to 0.7, c is a number in a range of 0 to 0.7, d is a number in a range of 0 to 0.9, e is a number in a range of 0 to 0.7, f is a number in a range of 0 to 0.1, and d+e is a number in a range of 0.3 to 0.9 and b+c+d+e is 1. Preferably, b is a number in a range of 0 to 0.6, c is a number in a range of 0 to 0.6, d is a number in a range of 0 to 0.9, e is a number in a range of 0.1 to 0.5, f is a number in a range of 0 to 0.05, and d+e is a number in a range of 0.4 to 0.9 and b+c+d+e is 1. This is because, when b, c, and d are numbers within the ranges described above, a hot melt silicone that is non-flowable and has a low surface stickiness and a sufficiently low melt viscosity at high temperatures while maintaining flexibility at 25° C., and when e is a number within the range described above, after cooling to 25° C. is performed after hot-melting, excellent adhesion is achieved and, in the case where an inorganic powder is charged, excellent dispersibility of the powder is achieved.

Specific examples of such component (A-1) include the following organopolysiloxanes. Note that, in the formulas, Me represents a methyl group, Ph represents a phenyl group, and Vi represents a vinyl group.

$$(ViMe_2SiO_{1/2})_{0.25}(PhSiO_{3/2})_{0.75}(HO_{1/2})_{0.02}$$

$$(ViMe_2SiO_{1/2})_{0.15}(PhSiO_{3/2})_{0.85}(HO_{1/2})_{0.01}$$

$$(Me_2SiO_{2/2})_{0.15}(MeViSiO_{2/2})_{0.10}(PhSiO_{3/2})_{0.75}(HO_{1/2})_{0.04}$$

$$(MeViPhSiO_{1/2})_{0.20}(PhSiO_{3/2})_{0.80}(HO_{1/2})_{0.05}$$

$$(ViMe_2SiO_{1/2})_{0.15}(PhSiO_{3/2})_{0.75}(SiO_{4/2})_{0.10}(HO_{1/2})_{0.02}$$

$$(Ph_2SiO_{2/2})_{0.25}(MeViSiO_{2/2})_{0.30}(PhSiO_{3/2})_{0.45}(HO_{1/2})_{0.04}$$

$$(Me_3SiO_{1/2})_{0.20}(ViMePhSiO_{1/2})_{0.40}(SiO_{4/2})_{0.40}(HO_{1/2})_{0.08}$$

In component (A-2), in the formula, $R^4$ are the same or different, halogen-substituted or unsubstituted monovalent hydrocarbon groups and examples thereof include the same groups exemplified for $R^1$ described above, and of these, a methyl group, a phenyl group, and a vinyl group are preferable. Furthermore, in the formula, $R^5$ is a hydrogen atom or an alkyl group having from 1 to 6 carbons. Examples of the alkyl group of $R^5$ include the same groups exemplified for $R^3$ described above, and of these, a methyl group and an ethyl group are preferable.

Furthermore, in the formula, g is a number in a range of 0.01 to 0.3, h is a number in a range of 0.4 to 0.99, i is a number in a range of 0 to 0.2, j is a number in a range of 0 to 0.2, k is a number in a range of 0 to 0.1, and i+j is a number in a range of 0 to 0.2 and g+h+i+j is 1. Preferably, g is a number in a range of 0.02 to 0.20, h is a number in a range of 0.6 to 0.99, i is a number in a range of 0 to 0.1, j is a number in a range of 0 to 0.1, k is a number in a range of 0 to 0.05, and i+j is a number in a range of 0 to 0.1 and g+h+i+j is 1. This is because, when g, h, i, and j are numbers within the ranges described above, a hot melt silicone that is non-flowable and has a low surface stickiness and a sufficiently low melt viscosity at high temperatures while maintaining flexibility at 25° C. can be obtained.

Specific examples of such component (A-2) include the following organopolysiloxanes. Note that, in the formulas, Me represents a methyl group, Ph represents a phenyl group, and Vi represents a vinyl group.

$ViMe_2SiO(SiMePhO)_{18}SiMe_2Vi$, that is,
   $(ViMe_2SiO_{1/2})_{0.10}(MePhSiO_{2/2})_{0.90}$ $ViMe_2SiO(SiMe_2O)_{35}(SiMePhO)_{13}SiMe_2Vi$, that is, $(ViMe_2SiO_{1/2})_{0.04}(Me_2SiO_{2/2})_{0.70}(MePhSiO_{2/2})_{0.26}$ $ViMe_2SiO(SiMe_2O)_{10}SiMe_2Vi$, that is, $(ViMe_2SiO_{1/2})_{0.17}(Me_2SiO_{2/2})_{0.83}$ $(ViMe_2SiO_{1/2})_{0.10}(MePhSiO_{2/2})_{0.80}(PhSiO_{3/2})_{0.10}$
   $(HO_{1/2})_{0.02}$ $(ViMe_2SiO_{1/2})_{0.20}(MePhSiO_{2/2})_{0.70}(SiO_{4/2})_{0.10}$
   $(HO_{1/2})_{0.01}$ The mass ratio of component (A-1) to component (A-2) is not limited; however, the mass ratio is preferably from 50:50 to 100:0, and more preferably from 60:40 to 100:0. This is because, when the mass ratio of component (A-1) to component (A-2) is within the range described above, a hot melt silicone that is non-flowable and has a low surface stickiness and a sufficiently low melt viscosity at high temperatures while maintaining flexibility at 25° C. can be obtained.

Component (B) is a component to crosslink component (A) and is an organopolysiloxane having at least two silicon atom-bonded hydrogen atoms in a molecule. The group bonded to the silicon atom, other than the hydrogen atom, of component (B) is a halogen-substituted or unsubstituted monovalent hydrocarbon group having no aliphatic unsaturated bond, and specific examples thereof include alkyl groups having from 1 to 12 carbons, such as a methyl group, an ethyl group, a propyl group, a butyl group, a pentyl group, a hexyl group, a heptyl group, an octyl group, a nonyl group, a decyl group, an undecyl group, and a dodecyl group; aryl groups having from 6 to 20 carbons, such as a phenyl group, a tolyl group, a xylyl group, a naphthyl group, an anthracenyl group, a phenanthryl group, and a pyrenyl group; aralkyl groups having from 7 to 20 carbons, such as a benzyl group, a phenethyl group, a naphthylethyl group, a naphthylpropyl group, an anthracenylethyl group, a phenanthrylethyl group, and a pyrenylethyl group; and groups in which some or all of the hydrogen atoms bonded to these groups are substituted with halogen atoms, such as chlorine atoms and/or bromine atoms.

Although such component (B) is not limited, component (B) is preferably an organopolysiloxane represented by the average composition formula:

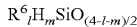

$R^6_l H_m SiO_{(4-l-m)/2}$

In the formula, $R^6$ is a halogen-substituted or unsubstituted monovalent hydrocarbon group having no aliphatic unsaturated bond, and examples thereof include alkyl groups having from 1 to 12 carbons, aryl groups having from 6 to 20 carbons, aralkyl groups having from 7 to 20 carbons, and groups in which some or all of the hydrogen atoms bonded to these groups are substituted with halogen atoms, such as chlorine atoms and/or bromine atoms, that are similar to those described above. Of these, a methyl group and a phenyl group are preferable.

Furthermore, in the formula, l is a number in a range of 1.0 to 2.5, and preferably a number in a range of 1.2 to 2.3, m is a number in a range of 0.01 to 0.9, and preferably a number in a range of 0.05 to 0.8, and l+m is a number in a range of 1.5 to 3.0, and preferably a number in a range of 2.0 to 2.7. This is because, when l and m are numbers within the ranges described above, a hot melt silicone that is non-flowable at 25° C. and has a low surface stickiness can be obtained.

Specific examples of such component (B) include the following organopolysiloxanes. Note that, in the formulas, Me represents a methyl group and Ph represents a phenyl group.

$Ph_2Si(OSiMe_2H)_2$, that is, $Ph_{0.67}Me_{1.33}H_{0.67}SiO_{0.67}$ $HMe_2SiO(Me_2SiO)_{20}SiMe_2H$, that is,
   $Me_{2.00}H_{0.09}SiO_{0.95}$ $PhSi(OSiMe_2H)_3$, that is, $Ph_{0.25}Me_{1.50}H_{0.75}SiO_{0.75}$ $(HMe_2SiO_{1/2})_{0.6}(PhSiO_{3/2})_{0.4}$, that is,
   $Ph_{0.40}Me_{1.20}H_{0.60}SiO_{0.90}$ The added amount of component (B) is in an amount such that the amount of the silicon atom-bonded hydrogen atom in component (B) is from 0.2 to 0.7 mol, and preferably from 0.3 to 0.6 mol, per 1 mol of the alkenyl group in component (A). This is because, when the added amount of component (B) is within the range described above, a hot melt silicone that is non-flowable and has a low surface stickiness and a sufficiently low melt viscosity at high temperatures while maintaining flexibility at 25° C. can be obtained.

Component (C) is a hydrosilylation reaction catalyst to promote the hydrosilylation reaction of components (A) and (B). Examples of such component (C) include platinum-based catalysts, rhodium-based catalysts, and palladium-based catalysts. Platinum-based catalysts are preferred due to the ability to remarkably promote curing of the present composition. Examples of the platinum-based catalyst include a platinum fine powder, chloroplatinic acid, an alcohol solution of chloroplatinic acid, a platinum-alkenylsiloxane complex, a platinum-olefin complex, and a platinum-carbonyl complex. Of these, a platinum-alkenylsiloxane complex is particularly preferable. Examples of the alkenylsiloxane include 1,3-divinyl-1,1,3,3-tetramethyldisiloxane, 1,3,5,7-tetramethyl-1,3,5,7-tetravinylcyclotetrasiloxane, alkenylsiloxanes having part of the methyl groups of these alkenylsiloxane substituted by ethyl groups, phenyl groups, or the like, and alkenylsiloxanes having vinyl groups of these alkenylsiloxane substituted by allyl groups, hexenyl groups, or the like. Due to excellent stability of the platinum-alkenylsiloxane complex, 1,3-divinyl-1,1,3,3-tetramethyldisiloxane is particularly preferable.

The added amount of component (C) is in an amount that promotes the hydrosilylation reaction of components (A) and (B). Specifically, the added amount of component (C) is preferably in an amount such that the amount of the metal atoms in the present component, in terms of a mass unit, is preferably in a range of 0.01 to 500 ppm, more preferably in a range of 0.01 to 100 ppm, and particularly preferably in a range of 0.01 to 50 ppm, relative to the total amount of components (A) and (B). This is because, when the added amount of component (C) is greater than or equal to the lower limit of the range described above, the hydrosilylation reaction of components (A) and (B) can be sufficiently promoted, and on the other hand, when the added amount is less than or equal to the upper limit of the range described above, problems such as coloring of the resulting hot melt silicone or the like are less likely to occur.

Furthermore, to obtain a uniform hot melt silicone, a solvent is preferably used in the reaction described above. However, it is required that this solvent not to inhibit the hydrosilylation reaction and is preferably a solvent except for alcohol-based solvents and solvents having a carbon-oxygen double bond since the alcohol-based solvents and the solvents having a carbon-oxygen double bond may react and generate byproducts. Specific examples of the solvent include aliphatic hydrocarbons, such as n-hexane, cyclohexane, and n-heptane; aromatic hydrocarbons, such as toluene, xylene, and mesitylene; ethers, such as tetrahydrofuran and dipropyl ether; silicones, such as hexamethyldisiloxane, octamethyltrisiloxane, and decamethyltetrasiloxane; esters, such as ethyl acetate, butyl acetate, and propylene glycol monomethyl ether acetate; and ketones, such as acetone, methyl ethyl ketone, and methyl isobutyl ketone. Note that this solvent can be removed after the hydrosilylation reaction by vaporization.

The hot melt silicone of the present invention is formed by subjecting components (A) and (B) to hydrosilylation reaction in the presence of component (C), and is non-flowable at 25° C., and the melt viscosity thereof at 100° C. is 5,000 Pa·s or less, and preferably in a range of 10 to 3,000 Pa·s. Note that "non-flowable" means not flowing when no load is applied, and indicates the condition at lower than the softening point measured by a testing method for the softening point by the Ring-and-ball method of a hot melt adhesive agent stipulated in JIS K 6863-1994, "Testing methods for the softening point of hot melt adhesives". That is, in order to be non-flowable at 25° C., the softening point needs to be higher than 25° C. This is because, when the hot melt silicone is non-flowable at 25° C., a hot melt silicone having excellent shape retention properties at the temperature and a low surface stickiness can be obtained. Furthermore, when the melt viscosity at 100° C. is within the range described above, a hot melt silicone having excellent adhesion after cooling to 25° C. that followed hot-melting is obtained. Furthermore, the softening point of the hot melt silicone of the present invention is preferably higher than 25° C. but lower than 50° C. That is, the hot melt silicone of the present invention preferably has a melt viscosity at 50° C. of 3,000 Pa·s or greater. Furthermore, the melt viscosity at 50° C. is preferably greater than or equal to 20 times the melt viscosity at 100° C., and more preferably greater than or equal to 25 times the melt viscosity at 100° C. This is because, when the melt viscosity at 50° C. is greater than or equal to the lower limit described above, or when the melt viscosity at 50° C. is greater than or equal to the lower limit described above relative to the melt viscosity at 100° C., non-flowability at 25° C., a low surface stickiness, and excellent hot melt properties are exhibited.

Next, the curable hot melt composition of the present invention will be described in detail.

The curable hot melt composition of the present invention comprises: (I) the hot melt silicone described above; (II) an organopolysiloxane which has at least two silicon atom-bonded hydrogen atoms in a molecule and in which the amount of silicon atom-bonded hydrogen atom is 0.5 mass % or greater, in an amount such that the amount of the silicon atom-bonded hydrogen atom in the present component is from 0.5 to 2.0 mol per 1 mol of alkenyl group in component (I); and (III) a catalytic amount of a hydrosilylation reaction catalyst.

Component (I) is as described above. Component (I) is a reaction product formed by subjecting components (A) and (B) to hydrosilylation reaction and, since the silicon atom-bonded hydrogen atom in component (B) is reacted to the alkenyl group in component (A) in an amount that is less than the equivalent amount of the alkenyl group in component (A), the alkenyl group remains in the obtained hot melt silicone. Furthermore, to promote the hydrosilylation reaction, since component (I) may further contain the hydrosilylation reaction catalyst for component (C) described above, a hydrosilylation reaction catalyst may be further added as necessary in the present composition.

Component (II) is an organopolysiloxane in which at least two silicon atom-bonded hydrogen atoms are contained in a molecule and which has 0.5 mass % or greater of the silicon atom-bonded hydrogen atom. This is because, when the amount of the silicon atom-bonded hydrogen atom is 0.5 mass % or greater, the present composition can be sufficiently cured. Furthermore, examples of the group bonded to the silicon atom, other than the hydrogen atom, of component (II) is a halogen-substituted or unsubstituted monovalent hydrocarbon group having no aliphatic unsaturated bond, and specific examples thereof include alkyl groups having from 1 to 12 carbons, such as a methyl group, an ethyl group, a propyl group, a butyl group, a pentyl group, a hexyl group, a heptyl group, an octyl group, a nonyl group, a decyl group, an undecyl group, and a dodecyl group; aryl groups having from 6 to 20 carbons, such as a phenyl group, a tolyl group, a xylyl group, a naphthyl group, an anthracenyl group, a phenanthryl group, and a pyrenyl group; aralkyl groups having from 7 to 20 carbons, such as a benzyl group, a phenethyl group, a naphthylethyl group, a naphthylpropyl group, an anthracenylethyl group, a phenanthrylethyl group, and a pyrenylethyl group; and groups in which some or all of the hydrogen atoms bonded to these groups are substituted with halogen atoms, such as chlorine atoms and/or bromine atoms.

Although such component (II) is not limited, component (II) is preferably an organopolysiloxane represented by the average composition formula:

$$R^7_n H_o SiO_{(4-n-o)/2}.$$

In the formula, $R^7$ is a halogen-substituted or unsubstituted monovalent hydrocarbon group having no aliphatic unsaturated bond, and examples thereof include alkyl groups having from 1 to 12 carbons, aryl groups having from 6 to 20 carbons, aralkyl groups having from 7 to 20 carbons, and groups in which some or all of the hydrogen atoms bonded to these groups are substituted with halogen atoms, such as chlorine atoms and/or bromine atoms, that are similar to those described above. Of these, a methyl group and a phenyl group are preferable.

Furthermore, in the formula, n is a number in a range of 1.0 to 2.5, and preferably a number in a range of 1.0 to 2.0, o is a number in a range of 0.5 to 1.5, and preferably a number in a range of 0.6 to 1.2, and n+o is a number in a range of 1.5 to 3.0, and preferably a number in a range of 2.0 to 2.7. This is because, when n and o are numbers within the ranges described above, the present composition can be sufficiently cured.

Specific examples of such component (II) include the following organopolysiloxanes. Note that, in the formulas, Me represents a methyl group and Ph represents a phenyl group.

$PhSi(OSiMe_2H)_3$, that is, $Ph_{0.25}Me_{1.50}H_{0.75}SiO_{0.75}$ $(HMe_2SiO_{1/2})_{0.6}(PhSiO_{3/2})_{0.4}$, that is, $Ph_{0.40}Me_{1.20}H_{0.60}SiO_{0.90}$ $(SiMeHO)_4$, that is, $Me_{1.00}H_{1.00}SiO_{1.00}$ $Me_3SiO(MeHSiO)_{40}SiMe_3$, that is, $Me_{1.10}H_{0.95}SiO_{0.98}$ $Me_3SiO(MeHSiO)_{20}SiMe_3$, that is, $Me_{1.18}H_{0.91}SiO_{0.95}$ The content of component (II) is in an amount such that the amount of the silicon atom-bonded hydrogen atom in the present component is in a range of 0.5 to 2.0 mol, preferably in a range of 0.6 to 1.5 mol, and even more preferably in a range of 0.7 to 1.3 mol, per 1 mol of alkenyl group in component (I). This is because, when the content of component (II) is within the range described above, the present composition can be sufficiently cured.

Component (III) is a hydrosilylation reaction catalyst to promote the hydrosilylation reaction of components (I) and (II). Examples of such component (III) include catalysts that are similar to those exemplified for component (C) described above. Further addition of a hydrosilylation reaction catalyst is optional in the present composition when component (I) contains the hydrosilylation reaction catalyst.

The content of component (III) is an in amount that promotes the hydrosilylation reaction of components (I) and (II). Specifically, the content of component (III) is preferably in an amount such that the amount of the metal atom in the present component, in terms of a mass unit, is preferably in a range of 0.01 to 500 ppm, more preferably in a range of 0.01 to 100 ppm, and particularly preferably in a range of 0.01 to 50 ppm, relative to the total amount of components (I) and (II). This is because, when the added amount of component (III) is greater than or equal to the lower limit of the range described above, the hydrosilylation reaction of components (I) and (II) can be sufficiently promoted, and on the other hand, when the added amount is less than or equal to the upper limit of the range described above, problems such as coloring of the resulting cured product or the like are less likely to occur.

A hydrosilylation reaction inhibitor, such as an alkyne alcohol such as 2-methyl-3-butyn-2-ol, 3,5-dimethyl-1-hexyn-3-ol, and 2-phenyl-3-butyn-2-ol; an ene-yne compound such as 3-methyl-3-penten-1-yne, and 3,5-dimethyl-3-hexen-1-yne; or 1,3,5,7-tetramethyl-1,3,5,7-tetravinylcyclotetrasiloxane, 1,3,5,7-tetramethyl-1,3,5,7-tetrahexenylcyclotetrasiloxane, or a benzotriazole, may be contained as another optional component in the present composition.

The content of the reaction inhibitor is not limited, but is preferably in a range of 0.0001 to 5 parts by mass per 100 parts by mass total of components (I) and (II) described above.

Furthermore, the present composition may contain a phosphor in order to convert the emission wavelength from an optical semiconductor element. This phosphor is exemplified by phosphors widely used in light emitting diodes (LEDs), such as yellow, red, green, and blue light-emitting phosphors formed from oxide phosphors, oxynitride phosphors, nitride phosphors, sulfide phosphors, oxysulfide phosphors, and the like. Examples of the oxide-based phosphors include yttrium, aluminum, and garnet-type YAG green to yellow light-emitting phosphors containing cerium ions; terbium, aluminum, and garnet-type TAG yellow light-emitting phosphors containing cerium ions; and silicate green to yellow light-emitting phosphors containing cerium or europium ions. Examples of the oxynitride-based phosphors include silicon, aluminum, oxygen, and nitrogen-type SiALON red to green light-emitting phosphors containing europium ions. Examples of the nitride-based phosphors include calcium, strontium, aluminum, silicon, and nitrogen-type CASN red light-emitting phosphors containing europium ions. Examples of the sulfide-based phosphors include ZnS green light-emitting phosphors containing copper ions or aluminum ions. Examples of the oxysulfide-based phosphors include $Y_2O_2S$ red light-emitting phosphors containing europium ions. Two or more types of these phosphors may be combined for use.

The present composition may also contain an adhesion-imparting agent for improving the adhesion of the composition. Preferred adhesion-imparting agents are organosilicon compounds having at least one alkoxy group bonded to a silicon atom in a molecule. This alkoxy group is exemplified by a methoxy group, an ethoxy group, a propoxy group, a butoxy group, and a methoxyethoxy group; and a methoxy group is particularly preferred. Furthermore, examples of other groups, excluding the alkoxy group bonded to the silicon atom, of the organosilicon compound include halogen-substituted or unsubstituted monovalent hydrocarbon groups, such as alkyl groups, alkenyl groups, aryl groups, aralkyl groups, and halogenated alkyl groups; glycidoxyalkyl groups, such as a 3-glycidoxypropyl group and a 4-glycidoxybutyl group; epoxycyclohexylalkyl groups, such as a 2-(3,4-epoxycyclohexyl)ethyl group and a 3-(3,4-epoxycyclohexyl)propyl group; epoxyalkyl groups, such as a 3,4-epoxybutyl group and a 7,8-epoxyoctyl group; acrylic group-containing monovalent organic groups, such as a 3-methacryloxypropyl group; and a hydrogen atom. The organosilicon compound preferably has a group that can react with an alkenyl group or silicon atom-bonded hydrogen atom in the present composition. Specifically, the organosilicon compound preferably has a silicon atom-bonded hydrogen atom or alkenyl group. Moreover, due to the ability to impart good adhesion to various types of substrates, this organosilicon compound preferably has at least one epoxy group-containing monovalent organic group in a molecule. This type of organosilicon compound is exemplified by organosilane compounds, organosiloxane oligomers, and alkyl silicates. Examples of the molecular structure of the organosiloxane oligomer or alkyl silicate include a straight structure, partially branched straight structure, branched chain structure, cyclic structure, and net-shaped structure. A straight structure, branched structure, and net-shaped structure are particularly preferred. Examples of this type of organosilicon compound include silane compounds, such as 3-glycidoxypropyl trimethoxysilane, 2-(3,4-epoxycyclohexyl)ethyl trimethoxysilane, and 3-methacryloxypropyl trimethoxysilane; siloxane compounds having at least one of silicon atom-bonded alkenyl groups or silicon atom-bonded hydrogen atoms, and at least one silicon atom-bonded alkoxy group in a molecule; mixtures of a silane compound or siloxane compound having at least one silicon atom-bonded alkoxy group or siloxane compound having at least one silicon atom-bonded hydroxyl group and at least one silicon atom-bonded alkenyl group in a molecule; and methyl polysilicate, ethyl polysilicate, and epoxy group-containing ethyl polysilicate. The adhesion-imparting agent is preferably a low-viscosity liquid, and the viscosity is not limited; however, the viscosity at 25° C. is preferably in a range of 1 to 500 mPa·s. Furthermore, in the present composition, the content of this adhesion-imparting agent is not limited, but is preferably in a range of 0.01 to 10 parts by mass per 100 parts by mass total of the present composition.

Furthermore, a silicone component having no silicon atom-bonded hydrogen atom; an inorganic filler, such as silica, titanium oxide, glass, alumina, or zinc oxide; an organic resin fine powder of a polymethacrylate resin, or the like; a heat-resistant agent, a dye, a pigment, a flame retardant, or the like may be contained as another optional component in the present composition at levels that do not impair the object of the present invention.

In particular, an inorganic filler can impart various characteristics to the present composition depending on the type of the inorganic filler. For example, a reinforcing filler, which is represented by silica and glass, can impart mechanical strength to the cured product obtained by curing the present composition and can make coefficient of linear expansion smaller.

Examples of such a reinforcing filler include spherical silica, non-spherical silica, and glass fibers. The spherical silica can be used to reduce melt viscosity since increase in viscosity of the resulting curable silicone composition is small. Meanwhile, non-spherical silica and glass fibers exhibit higher effect of imparting mechanical strength to the resulting cured product and higher effect of reducing coefficient of linear expansion compared to those of the spherical silica, and thus can be suitably used when these characteristics are important. The average particle diameter of the reinforcing filler is not particularly limited but is preferably in a range of 0.1 to 100 μm.

Furthermore, a white pigment, which is represented by titanium oxide, can impart light reflection properties to the cured product obtained by curing the present composition. Examples of such titanium oxide powder include anatase-type titanium oxide powder and rutile-type titanium oxide powder, and from the perspectives of high light reflection properties and opacifying properties of the cured product, rutile-type titanium oxide powder is preferable. The average particle diameter of this titanium oxide is in a range of 0.05 to 10 μm, and preferably in a range of 0.01 to 5 μm or in a range of 0.01 to 3 μm. The surface of this titanium oxide may be subjected to surface treatment using a silane coupling agent, silica, alumina, zirconia, and the like, in advance. Furthermore, examples of the white pigment, except the titanium oxide, include metal oxides, such as alumina, zinc oxide, zirconium oxide, and magnesium oxide, as well as barium sulfate, zinc sulfate, barium titanate, aluminum nitride, boron nitride, and antimony oxide.

Furthermore, thermally conductive filler, which is represented by alumina and zinc oxide, can impart thermal conductivity or electrical conductivity to the cured product obtained by curing the present composition. Examples of the thermally conductive filler include, in additions to those described above, metal fine powder, such as fine powder of gold, silver, nickel, copper, or the like; fine powder in which a metal, such as gold, silver, nickel, or copper, is deposited or plated on the surface of fine powder of ceramic, glass, quartz, an organic resin, or the like; metal compounds, such as aluminum oxide, aluminum nitride, and zinc oxide, and mixtures of two or more types of these.

Furthermore, an inorganic filler that is surface-treated with a treatment agent, such as organoalkoxysilane, such as methyltrimethoxysilane; organohalosilane, such as trimethylchlorosilane; organosilazane, such as hexamethyldisilazane; siloxane oligomers, such as a dimethylsiloxane oligomer capped with α,ω-silanol groups, a methylphenylsiloxane oligomer capped with α,ω-silanol groups, and a methylvinylsiloxane oligomer capped with α,ω-silanol groups, may be used as such an inorganic filler.

In the present composition, a single type of inorganic filler or a combination of two or more types of inorganic fillers may be used. The content of the inorganic filler is not particularly limited; however, from the perspectives of hardness and mechanical strength of the cured product, the content is preferably in a range of 10 to 1,000 parts by mass, and more preferably in a range of 100 to 500 parts by mass, per 100 parts by mass of the present composition.

The method of mixing the inorganic filler into the present composition is not limited, and examples thereof include a method including the steps 1 and 2 described below.

Step 1

A hot melt silicone is formed into a fine powder form. Examples of the method thereof include a method in which a solid hot melt silicone is crushed using a grinder, and a method in which, after a hot melt silicone is dissolved in a solvent, this liquid is sprayed and then the solvent is removed, or the solvent is removed in a kneader. The apparatus to grind the hot melt silicone is not particularly limited as long as the apparatus is a grinder that is typically used in this technical field, and examples thereof include various grinders, such as roll mills, ball mills, jet mills, turbo mills, and planetary mills. Furthermore, examples of the apparatus to remove the solvent from the hot melt silicone solution include spray dryers, twin-screw kneaders, and belt dryers.

Step 2

To the finely powdered hot melt silicone obtained by the step 1, component (II), component (III), and other optional component(s), and the inorganic filler described above are mixed. The mixing method may be a conventionally known method and is not particularly limited; however, typically, the mixing can be performed using a powder mixer. Specific examples thereof include agitation/mixing devices, such as a single-screw or twin-screw continuous mixer, twin roller, Ross mixer, Hobart mixer, dental mixer, planetary mixer, kneader mixer, and Labo Milser, and a Henschel mixer. Of these, a Labo Milser and a Henschel mixer are preferable.

The finely powdered curable hot melt composition obtained as described above can be, as desired, formed into curable pellets by compressing the finely powdered curable hot melt composition into tablets. The tablet press is not particularly limited, and an ordinary tablet press can be used. The form of the curable pellets is not particularly limited; however, typically the form is spherical, ellipsoidal, or cylindrical. Furthermore, the size thereof is not particularly limited; however, for example, the size is an average particle diameter or a diameter of the equivalent circle of 500 μm or greater. Note that "pellet" is also referred to as "tablet".

Furthermore, preferably, the present composition cures to form a cured product having a type D durometer hardness at 25° C. of 10 or greater. This is because, when the type D durometer hardness at 25° C. of the cured product is greater than or equal to the lower limit described above, excellent mechanical characteristics are exhibited. Furthermore, preferably, the present composition cures to form a cured product having a type D durometer hardness at 25° C. of 50 or greater in the case where an inorganic filler is added to the present composition to form a curable fine powder or pellets. Furthermore, the type D durometer hardness at 25° C. of the cured product is preferably 90 or less. This is because, when the type D durometer hardness at 25° C. of the cured product is less than or equal to the upper limit described above, excellent flexibility is exhibited. Note that this type D durometer hardness is determined by a type D durometer in accordance with JIS K 6253-1997, "Rubber, Vulcanized or Thermoplastic—Determination of Hardness".

EXAMPLES

The hot melt silicone and the curable hot melt composition of the present invention will be described in detail using Examples and comparative examples. Note that the surface stickiness was measured using a texture analyzer, and the surface stickiness was evaluated as being "low" when the measured value was closer to the lower detection limit value. The melt viscosities at 50° C. and 100° C. were measured using a cone plate viscometer which was capable of adjusting the temperature. Furthermore, in the formulas, Me represents a methyl group, Ph represents a phenyl group, and Vi represents a vinyl group.

Example 1

A mixture of 92.4 parts by mass of an organopolysiloxane (vinyl group content=4.4 mass %) represented by the average unit formula:

$(ViMe_2SiO_{1/2})_{0.20}(PhSiO_{3/2})_{0.80}(HO_{1/2})_{0.02}$ 7.6 parts by mass of an organopolysiloxane (silicon atom-bonded hydrogen atom content=0.60 mass %) represented by the formula:

$Ph_2Si(OSiMe_2H)_2$ (an amount such that the amount of the silicon atom-bonded hydrogen atom in the present component was 0.30 mol per 1 mol of the vinyl group in the organopolysiloxane described above), 0.10 parts by mass of 1,3-divinyltetramethyldisiloxane solution of platinum-1,3-divinyltetramethyldisiloxane complex (platinum metal content=approximately 6,000 ppm by mass) as a hydrosilylation reaction catalyst, and 50 parts by mass of toluene were reacted at 100° C. for 2 hours. The obtained reaction liquid was applied to a PET film so that the thickness thereof was approximately 200 μm, and heated in an oven at 120° C. for 1 hour to vaporize toluene, thereby obtaining a film-like hot melt silicone that was non-flowable at 25° C. and had a low surface stickiness. The melt viscosity at 50° C. of this hot melt silicone was 90,000 Pa·s, and the melt viscosity at 100° C. was 2,900 Pa·s.

Example 2

A mixture of 62.5 parts by mass of an organopolysiloxane (vinyl group content=4.4 mass %) represented by the average unit formula:

$(ViMe_2SiO_{1/2})_{0.20}(PhSiO_{3/2})_{0.80}(HO_{1/2})_{0.02}$ 37.5 parts by mass of an organopolysiloxane (silicon atom-bonded hydrogen atom content=0.12 mass %) represented by the formula:

$HMe_2SiO(Me_2SiO)_{20}SiMe_2H$ (an amount such that the amount of the silicon atom-bonded hydrogen atom in the present component was 0.45 mol per 1 mol of the vinyl group in the organopolysiloxane described above), 0.10 parts by mass of 1,3-divinyltetramethyldisiloxane solution of platinum-1,3-divinyltetramethyldisiloxane complex (platinum metal content=approximately 6,000 ppm by mass) as a hydrosilylation reaction catalyst, and 50 parts by mass of toluene were reacted at 100° C. for 2 hours. The obtained reaction liquid was applied to a polyethylene terephthalate (PET) film so that the thickness thereof was approximately 200 μm, and heated in an oven at 120° C. for 1 hour to vaporize toluene, thereby obtaining a film-like hot melt silicone that was non-flowable at 25° C. and had a low surface stickiness. The melt viscosity at 50° C. of this hot melt silicone was 5,300 Pa·s, and the melt viscosity at 100° C. was 200 Pa·s.

Example 3

A mixture of 76.2 parts by mass of an organopolysiloxane (vinyl group content=2.3 mass %) represented by the average unit formula:

$(Me_2SiO_{2/2})_{0.15}(MeViSiO_{2/2})_{0.10}(PhSiO_{3/2})_{0.75}(HO_{1/2})_{0.04}$ 20.0 parts by mass of an organopolysiloxane (vinyl group content=2.1 mass %) represented by the formula:

$ViMe_2SiO(SiMe_2O)_{10}SiMe_2Vi$ 3.8 parts by mass of an organopolysiloxane (silicon atom-bonded hydrogen atom content=0.65 mass %) represented by the average unit formula:

$(HMe_2SiO_{1/2})_{0.6}(PhSiO_{3/2})_{0.4}$ (an amount such that the amount of the silicon atom-bonded hydrogen atom in the present component was 0.30 mol per 1 mol total of the vinyl groups in the two types of organopolysiloxanes described above), 0.10 parts by mass of 1,3-divinyltetramethyldisiloxane solution of platinum-1,3-divinyltetramethyldisiloxane complex (platinum metal content=approximately 6,000 ppm by mass) as a catalyst for hydrosilylation reaction, and 50 parts by mass of toluene were reacted at 100° C. for 2 hours. The obtained reaction liquid was applied to a PET film so that the thickness thereof was approximately 200 μm, and heated in an oven at 120° C. for 1 hour to vaporize toluene, thereby obtaining a film-like hot melt silicone that was non-flowable at 25° C. and had a low surface stickiness. The melt viscosity at 50° C. of this hot melt silicone was 25,000 Pa·s, and the melt viscosity at 100° C. was 650 Pa·s.

Example 4

A mixture of 83.4 parts by mass of an organopolysiloxane (vinyl group content=5.0 mass %) represented by the average unit formula:

$(MeViSiO_{2/2})_{0.25}(Ph_2SiO_{2/2})_{0.30}(PhSiO_{3/2})_{0.45}(HO_{1/2})_{0.04}$ 16.6 parts by mass of an organopolysiloxane (silicon atom-bonded hydrogen atom content=0.60 mass %) represented by the formula:

$Ph_2Si(OSiMe_2H)_2$ (an amount such that the amount of the silicon atom-bonded hydrogen atom in the present component was 0.60 mol per 1 mol of the vinyl group in the organopolysiloxane described above), and 0.10 parts by mass of 1,3-divinyltetramethyldisiloxane solution of platinum-1,3-divinyltetramethyldisiloxane complex (platinum metal content=approximately 6,000 ppm by mass) as a hydrosilylation reaction catalyst were reacted at 100° C. for 2 hours, thereby obtaining a hot melt silicone that was non-flowable at 25° C. The melt viscosity at 50° C. of the hot melt silicone was 6,500 Pa·s, and the melt viscosity at 100° C. was 130 Pa·s.

Example 5

To 200 parts by mass of a 50 mass % toluene solution of the hot melt silicone that was prepared in Example 1 and that contained the hydrosilylation reaction catalyst (vinyl group content=2.9 mass %; platinum metal content=approximately 6 ppm by mass), 11.6 parts by mass of an organopolysiloxane (silicon atom-bonded hydrogen atom content=0.91 mass %) represented by the formula:

$PhSi(OSiMe_2H)_3$ (an amount such that the amount of the silicon atom-bonded hydrogen atom in the present component was 1.0 mol per 1 mol of the vinyl group in the hot melt silicone described above), and 0.1 parts by mass of 2-phenyl-3-butyn-2-ol were added and uniformly mixed. The obtained solution was applied to a PET film so that the thickness thereof was approximately 200 μm, and heated in an oven at 100° C. for 30 minutes to vaporize toluene, thereby obtaining a film-like hot melt composition that was non-flowable at 25° C. and had a low surface stickiness. It was confirmed that this hot melt composition was melted when the hot melt composition was heated to 150° C. Thereafter, this hot melt composition was peeled off from the PET film, and 10 sheets of the hot melt compositions were adhered to each other and compressed in a mold at 150° C. for 30 minutes to obtain a uniform cured product having a thickness of 1 mm. Even when the obtained cured product was heated to 150° C., the cured product was not melted again, and it was confirmed that the product was cured. The type D durometer hardness of this cured product was 45.

Example 6

To 200 parts by mass of a 50 mass % toluene solution of the hot melt silicone that was prepared in Example 2 and that contained the hydrosilylation reaction catalyst (vinyl group content=1.5 mass %; platinum metal content=approximately 6 ppm by mass), 5.5 parts by mass of an organopolysiloxane (silicon atom-bonded hydrogen atom content=1.5 mass %) represented by the formula:

Me$_3$SiO(MeHSiO)$_{20}$SiMe$_3$ (an amount such that the amount of the silicon atom-bonded hydrogen atom in the present component was 1.4 mol per 1 mol of the vinyl group in the hot melt silicone described above), and 0.1 parts by mass of 2-phenyl-3-butyn-2-ol were added and uniformly mixed. The obtained solution was applied to a PET film so that the thickness thereof was approximately 200 μm, and heated in an oven at 100° C. for 30 minutes to vaporize toluene, thereby obtaining a film-like hot melt composition that was non-flowable at 25° C. and had a low surface stickiness. It was confirmed that this hot melt composition was melted when the hot melt composition was heated to 150° C. Thereafter, this hot melt composition was peeled off from the PET film, and 10 sheets of the hot melt compositions were adhered to each other and compressed in a mold at 150° C. for 30 minutes to obtain a uniform cured product having a thickness of 1 mm. Even when the obtained cured product was heated to 150° C., the cured product was not melted again, and it was confirmed that the product was cured. The type D durometer hardness of this cured product was 50.

Example 7

To 200 parts by mass of a 50 mass % toluene solution of the hot melt silicone that was prepared in Example 3 and that contained the hydrosilylation reaction catalyst (vinyl group content=1.2 mass %; platinum metal content=approximately 6 ppm by mass), 9.4 parts by mass of an organopolysiloxane (silicon atom-bonded hydrogen atom content=0.65 mass %) represented by the average unit formula:

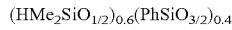

(HMe$_2$SiO$_{1/2}$)$_{0.6}$(PhSiO$_{3/2}$)$_{0.4}$ (an amount such that the amount of the silicon atom-bonded hydrogen atom in the present component was 1.3 mol per 1 mol of the vinyl group in the hot melt silicone described above), and 0.1 parts by mass of 2-phenyl-3-butyn-2-ol were added and uniformly mixed. The obtained solution was applied to a PET film so that the thickness thereof was approximately 200 μm, and heated in an oven at 100° C. for 30 minutes to vaporize toluene, thereby obtaining a film-like hot melt composition that was non-flowable at 25° C. and had a low surface stickiness. It was confirmed that this hot melt composition was melted when the hot melt composition was heated to 150° C. Thereafter, this hot melt composition was peeled off from the PET film, and 10 sheets of the hot melt compositions were adhered to each other and compressed in a mold at 150° C. for 30 minutes to obtain a uniform cured product having a thickness of 1 mm. Even when the obtained cured product was heated to 150° C., the cured product was not melted again, and it was confirmed that the product was cured. The type D durometer hardness of this cured product was 35.

Example 8

To 200 parts by mass of a 50 mass % toluene solution of the hot melt silicone that was prepared in Example 3 and that contained the hydrosilylation reaction catalyst (vinyl group content=1.7 mass %; platinum metal content=approximately 6 ppm by mass), 5.0 parts by mass of an organopolysiloxane (silicon atom-bonded hydrogen atom content=1.7 mass %) represented by the formula:

(SiMeHO)$_4$ (an amount such that the amount of the silicon atom-bonded hydrogen atom in the present component was 1.4 mol per 1 mol of the vinyl group in the hot melt silicone described above), and 0.1 parts by mass of 2-phenyl-3-butyn-2-ol were added and uniformly mixed. The obtained solution was applied to a PET film so that the thickness thereof was approximately 200 μm, and heated in an oven at 100° C. for 30 minutes to vaporize toluene, thereby obtaining a film-like hot melt composition that was non-flowable at 25° C. and had a low surface stickiness. It was confirmed that this hot melt composition was melted when the hot melt composition was heated to 150° C. Thereafter, this hot melt composition was peeled off from the PET film, and 10 sheets of the hot melt compositions were adhered to each other and compressed in a mold at 150° C. for 30 minutes to obtain a uniform cured product having a thickness of 1 mm. Even when the obtained cured product was heated to 150° C., the cured product was not melted again, and it was confirmed that the product was cured. The type D durometer hardness of this cured product was 56.

Comparative Example 1

A mixture of 81.5 parts by mass of an organopolysiloxane (vinyl group content=4.4 mass %) represented by the average unit formula:

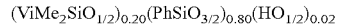

(ViMe$_2$SiO$_{1/2}$)$_{0.20}$(PhSiO$_{3/2}$)$_{0.80}$(HO$_{1/2}$)$_{0.02}$ 18.5 parts by mass of an organopolysiloxane (silicon atom-bonded hydrogen atom content=0.60 mass %) represented by the formula:

Ph$_2$Si(OSiMe$_2$H)$_2$ (an amount such that the amount of the silicon atom-bonded hydrogen atom in the present component was 0.83 mol per 1 mol of the vinyl group in the organopolysiloxane described above), 0.10 parts by mass of 1,3-divinyltetramethyldisiloxane solution of platinum-1,3-divinyltetramethyldisiloxane complex (platinum metal content=approximately 6,000 ppm by mass) as a hydrosilylation reaction catalyst, and 50 parts by mass of toluene were reacted at 100° C. for 2 hours, thereby obtaining a reaction product that was non-flowable. After a part of this reaction product was taken out and heated in an oven at 120° C. for 1 hour to vaporize toluene, the reaction product was an aggregated substance that was non-flowable at 25° C. and that had a low surface stickiness, and it was confirmed that the reaction product was non-flowable at both temperatures of 50° C. and 100° C. and did not exhibit hot melt properties.

Comparative Example 2

A mixture of 48.0 parts by mass of an organopolysiloxane (vinyl group content=4.4 mass %) represented by the average unit formula:

(ViMe$_2$SiO$_{1/2}$)$_{0.20}$(PhSiO$_{3/2}$)$_{0.80}$(HO$_{1/2}$)$_{0.02}$ 52.0 parts by mass of an organopolysiloxane (silicon atom-bonded hydrogen atom content=0.12 mass %) represented by the formula:

HMe$_2$SiO(Me$_2$SiO)$_{20}$SiMe$_2$H (an amount such that the amount of the silicon atom-bonded hydrogen atom in the present component was 0.82 mol per 1 mol of the vinyl group in the organopolysiloxane described above), 0.10 parts by mass of 1,3-divinyltetramethyldisiloxane solution of platinum-1,3-divinyltetramethyldisiloxane complex (platinum metal content=approximately 6,000 ppm by mass) as a hydrosilylation reaction catalyst, and 50 parts by mass of toluene were reacted at 100° C. for 2 hours, thereby obtaining a reaction product that was non-flowable. After a part of this reaction product was taken out and heated in an oven at 120° C. for 1 hour to vaporize toluene, the reaction product was an aggregated substance that was non-flowable at 25° C. and that had a low surface stickiness, but it was confirmed that the reaction product was non-flowable at both temperatures of 50° C. and 100° C. and did not exhibit hot melt properties.

Comparative Example 3

A mixture of 70.4 parts by mass of an organopolysiloxane (vinyl group content=2.3 mass %) represented by the average unit formula:

(Me$_2$SiO$_{2/2}$)$_{0.15}$(MeViSiO$_{2/2}$)$_{0.10}$(PhSiO$_{3/2}$)$_{0.75}$(HO$_{1/2}$)$_{0.04}$ 20.0 parts by mass of an organopolysiloxane (vinyl group content=2.1 mass %) represented by the formula:

ViMe$_2$SiO(SiMe$_2$O)$_{10}$SiMe$_2$Vi 9.6 parts by mass of an organopolysiloxane (silicon atom-bonded hydrogen atom content=0.65 mass %) represented by the average unit formula:

(HMe$_2$SiO$_{1/2}$)$_{0.6}$(PhSiO$_{3/2}$)$_{0.4}$ (an amount such that the amount of the silicon atom-bonded hydrogen atom in the present component was 0.82 mol per 1 mol total of the vinyl groups in the two types of organopolysiloxanes described above), 0.10 parts by mass of 1,3-divinyltetramethyldisiloxane solution of platinum-1,3-divinyltetramethyldisiloxane complex (platinum metal content=approximately 6,000 ppm by mass) as a hydrosilylation reaction catalyst, and 50 parts by mass of toluene were reacted at 100° C. for 2 hours, thereby obtaining a reaction product that was non-flowable. After a part of this reaction product was taken out and heated in an oven at 120° C. for 1 hour to vaporize toluene, the reaction product was an aggregated substance that was non-flowable at 25° C. and that had a low surface stickiness, but it was confirmed that the reaction product was non-flowable at both temperatures of 50° C. and 100° C. and did not exhibit hot melt properties.

Comparative Example 4

A mixture of 95.0 parts by mass of an organopolysiloxane (vinyl group content=5.0 mass %) represented by the average unit formula:

(MeViSiO$_{2/2}$)$_{0.25}$(Ph$_2$SiO$_{2/2}$)$_{0.30}$(PhSiO$_{3/2}$)$_{0.45}$(HO$_{1/2}$)$_{0.04}$ 5.0 parts by mass of an organopolysiloxane (silicon atom-bonded hydrogen atom content=0.12 mass %) represented by the formula:

HMe$_2$SiO(Me$_2$SiO)$_{20}$SiMe$_2$H (an amount such that the amount of the silicon atom-bonded hydrogen atom in the present component was 0.60 mol per 1 mol of the vinyl group in the organopolysiloxane described above), and 0.10 parts by mass of 1,3-divinyltetramethyldisiloxane solution of platinum-1,3-divinyltetramethyldisiloxane complex (platinum metal content=approximately 6,000 ppm by mass) as a hydrosilylation reaction catalyst were reacted at 100° C. for 2 hours, thereby obtaining a high-viscosity liquid having high stickiness at 25° C. The viscosity of this liquid at 50° C. was 1,700 Pa·s, and the viscosity at 100° C. was 23 Pa·s, and it was confirmed that this liquid did not exhibit hot melt properties.

Comparative Example 5

To 200 parts by mass of a 50 mass % toluene solution of the hot melt silicone that was prepared in Example 1 and that contained the hydrosilylation reaction catalyst (vinyl group content=2.9 mass %; platinum metal content=approximately 6 ppm by mass), 5.0 parts by mass of an organopolysiloxane (silicon atom-bonded hydrogen atom content=0.91 mass %) represented by the formula:

PhSi(OSiMe$_2$H)$_3$ (an amount such that the amount of the silicon atom-bonded hydrogen atom in the present component was 0.43 mol per 1 mol of the vinyl group in the hot melt silicone described above), and 0.1 parts by mass of 2-phenyl-3-butyn-2-ol were added and uniformly mixed. The obtained solution was applied to a PET film so that the thickness thereof was approximately 200 μm, and heated in an oven at 100° C. for 30 minutes to vaporize toluene, thereby obtaining a film-like hot melt composition that was non-flowable at 25° C. and had a low surface stickiness. It was confirmed that this hot melt composition was melted when the hot melt composition was heated to 150° C. Thereafter, this hot melt composition was peeled off from the PET film, and 10 sheets of the hot melt compositions were adhered to each other and compressed in a mold at 150° C. for 30 minutes to obtain a uniform sheet having a thickness of 1 mm. However, when this sheet was heated to 150° C., the sheet was melted again, and thus it was confirmed that the sheet was not cured.

Comparative Example 6

To 200 parts by mass of a 50 mass % toluene solution of the hot melt silicone that was prepared in Example 2 and that contained the hydrosilylation reaction catalyst (vinyl group content=1.5 mass %; platinum metal content=approximately 6 ppm by mass), 42 parts by mass of an organopolysiloxane (silicon atom-bonded hydrogen atom content=0.12 mass %) represented by the formula:

$HMe_2SiO(Me_2SiO)_{20}SiMe_2H$ (an amount such that the amount of the silicon atom-bonded hydrogen atom in the present component was 0.93 mol per 1 mol of the vinyl group in the hot melt silicone described above), and 0.1 parts by mass of 2-phenyl-3-butyn-2-ol were added and uniformly mixed. The obtained solution was applied to a PET film so that the thickness thereof was approximately 200 μm, and heated in an oven at 100° C. for 30 minutes to vaporize toluene, thereby obtaining a high-viscosity liquid that was flowable at 25° C. After this liquid was compressed in a mold at 150° C. for 30 minutes, a uniform sheet having a thickness of 1 mm was obtained. Even when this sheet was heated to 150° C., the sheet was not melted again, and it was confirmed that the sheet was cured. The type D durometer hardness of this cured product was 42.

Example 9

A mixture of 148.78 parts by mass of an organopolysiloxane (vinyl group content=4.4 mass %) represented by the average unit formula:

$(ViMe_2SiO_{1/2})_{0.20}(PhSiO_{3/2})_{0.80}(HO_{1/2})_{0.02}$ 21.3 parts by mass of an organopolysiloxane (silicon atom-bonded hydrogen atom content=0.60 mass %) represented by the formula:

$Ph_2Si(OSiMe_2H)_2$ (an amount such that the amount of the silicon atom-bonded hydrogen atom in the present component was 0.50 mol per 1 mol of the vinyl group in the organopolysiloxane described above), 0.034 parts by mass of 1,3-divinyltetramethyldisiloxane solution of platinum-1,3-divinyltetramethyldisiloxane complex (platinum metal content=approximately 2,000 ppm by mass) as a hydrosilylation reaction catalyst, and 122 parts by mass of toluene were reacted at 100° C. for 2 hours. The obtained reaction liquid was applied to a PET film so that the thickness thereof was approximately 200 μm, and heated in an oven at 120° C. for 1 hour to vaporize toluene, thereby obtaining a film-like hot melt silicone that was non-flowable at 25° C. and had no surface stickiness. The melt viscosity at 50° C. of the hot melt silicone was not measurable, and the melt viscosity at 100° C. was 300 Pa·s.

Preparation of Finely Powdered Hot Melt Silicone (1)

The reaction liquid obtained in Example 9 was charged in a twin-screw kneader heated to 150° C. to remove toluene, and then the obtained hot melt silicone was crushed using a ball mill while being cooled to obtain finely powdered hot melt silicone (1). When the obtained powder was observed using an optical microscope, the powder had irregular shapes of 1,000 to 3,000 μm.

Preparation of Finely Powdered Hot Melt Silicone (2)

The reaction liquid obtained in Example 9 was spray-dried to form powder while toluene was being removed, thereby obtaining finely powdered hot melt silicone (2). When the obtained powder was observed using an optical microscope, the powder had regular spherical shapes of 5 to 10 μm.

Example 10

Into a Labo Milser, 89.3 parts by mass of the finely powdered hot melt silicone (1) described above, 5.35 parts by mass of diphenylpolysiloxane capped at both molecular terminals with dimethylhydrogensiloxy groups that had a viscosity of 5 mPa·s (silicon atom-bonded hydrogen atom content=0.6 wt. %) and that was represented by the formula:

$HMe_2SiO(Ph_2SiO)SiMe_2H$ 5.35 parts by mass of branched organopolysiloxane (silicon atom-bonded hydrogen atom content=0.65 mass %) that had two or more silicon atom-bonded hydrogen atoms in a molecule, that had a viscosity of 25 mPa·s, and that was represented by the average unit formula:

$(PhSiO_{3/2})_{0.4}(HMe_2SiO_{1/2})_{0.6}$ (an amount such that the amount of the silicon atom-bonded hydrogen atom in the diphenylpolysiloxane and branched organopolysiloxane described above was 1.0 mol per 1 mol total of the vinyl groups in the finely powdered hot melt silicone (1) described above), 1-ethynyl-1-cyclohexanol (in terms of a mass unit, 300 ppm relative to the amount of the present composition), and 402 parts by mass of spherical silica having an average particle diameter of 15 μm (HS-202, manufactured by Nippon Steel & Sumikin Materials Co., Ltd. Micron Company) were charged at once and agitated for 1 minute to obtain a white, uniform powder composition. The obtained powder composition was compressed into a tablet using a tablet press to obtain a cylindrical curable pellet having a diameter of 14 mm and a height of 22 mm.

It was confirmed that this curable pellet was melted when the curable pellet was heated to 150° C. After this curable pellet was compressed in a mold with a thickness of 1 mm at 150° C. for 30 minutes, a white, uniform cured product having a thickness of 1 mm was obtained. Even when the obtained cured product was heated to 150° C., the cured product was not melted again, and it was confirmed that the product was cured. The type D durometer hardness of this cured product was 88.

Example 11

Into a Labo Milser, 89.3 parts by mass of the finely powdered hot melt silicone (2) described above, 10.7 parts by mass of diphenylpolysiloxane capped at both molecular terminals with dimethylhydrogensiloxy groups that had a viscosity of 5 mPa·s (silicon atom-bonded hydrogen atom content=0.6 wt. %) and that was represented by the formula:

$HMe_2SiO(Ph_2SiO)SiMe_2H$ (an amount such that the amount of the silicon atom-bonded hydrogen atom in the present component was 1.0 mol per 1 mol total of the vinyl groups in the finely powdered hot melt silicone (2) described above), 1-ethynyl-1-cyclohexanol (in terms of a mass unit, 300 ppm relative to the amount of the present composition), 192 parts by mass of spherical silica having an average particle diameter of 15 μm (HS-202, manufactured by Nippon Steel & Sumikin Materials Co., Ltd. Micron Company), 156 parts by mass of titanium oxide having an average particle diameter of 0.5 μm (SX-3103, manufactured by Sakai Chemical Industry Co., Ltd.), and 54 parts by mass of glass fiber having a fiber diameter of 6 μm and a fiber length of 50 μm (EFDE50-01, manufactured by Central Glass Co., Ltd.) were charged at once and agitated for 1 minute to obtain a white, uniform powder composition. The obtained powder composition was compressed into a tablet using a tablet press to obtain a cylindrical curable pellet having a diameter of 14 mm and a height of 22 mm.

It was confirmed that this curable pellet was melted when the curable pellet was heated to 150° C. After this curable pellet was compressed in a mold with a thickness of 1 mm at 150° C. for 30 minutes, a white, uniform cured product having a thickness of 1 mm was obtained. Even when the obtained cured product was heated to 150° C., the cured product was not melted again, and it was confirmed that the product was cured. The type D durometer hardness of this cured product was 87.

INDUSTRIAL APPLICABILITY

Since the hot melt silicone of the present invention is non-flowable at 25° C., has a low surface stickiness, and easily melts by heating, the hot melt silicone of the present invention is suitable for sealing agents of semiconductor devices, hot melt adhesives, and the like. Furthermore, since the curable hot melt composition of the present invention has curability as well as hot melt properties, the curable hot melt composition of the present invention is suitable for applications described above which require durability.

The invention claimed is:

1. A curable hot melt composition comprising: (I) a hot melt silicone; (II) an organopolysiloxane which has at least two silicon atom-bonded hydrogen atoms in a molecule and in which an amount of silicon atom-bonded hydrogen atom is 0.5 mass % or greater, in an amount such that an amount of the silicon atom-bonded hydrogen atom in component (II) is from 0.5 to 2.0 mol per 1 mol of alkenyl group in component (I); and (III) a hydrosilylation reaction catalyst, wherein component (I) is non-flowable at 25° C. and has a melt viscosity at 100° C. of 5,000 Pa·s or less, and is formed by subjecting (A) an alkenyl group-containing organopolysiloxane in which 10 mol % or greater of all of silicon atom-bonded organic groups is a phenyl group, and (B) an organopolysiloxane having at least two silicon atom-bonded hydrogen atoms in a molecule, in an amount such that an amount of the silicon atom-bonded hydrogen atoms in component (B) is from 0.2 to 0.7 mol per 1 mol of alkenyl group in component (A), to hydrosilylation reaction in the presence of (C) a hydrosilylation reaction catalyst, in an amount that is sufficient to promote the hydrosilylation reaction of components (A) and (B).

2. The curable hot melt composition according to claim 1, wherein component (II) is an organopolysiloxane represented by the average composition formula:

$R^7_n H_o SiO_{(4-n-o)/2}$ wherein, $R^7$ is independently a halogen-substituted or unsubstituted monovalent hydrocarbon group having no aliphatic unsaturated bond, n is a number of 1.0 to 2.5, o is a number of 0.5 to 1.5, and n+o is a number of 1.5 to 3.0.

3. The curable hot melt composition according to claim 1, further comprising a hydrosilylation reaction inhibitor in an amount of 0.0001 to 5 parts by mass per 100 parts by mass total of components (I) and (II).

4. The curable hot melt composition according to claim 1, wherein a type D durometer hardness at 25° C. of a cured product obtained by curing the curable hot melt composition is 10 or greater.

5. The curable hot melt composition according to claim 1, wherein component (I) has a melt viscosity at 50° C. of 3,000 Pa·s or greater.

6. The curable hot melt composition according to claim 1, wherein component (I) has a melt viscosity at 50° C. greater than or equal to 20 times a melt viscosity at 100° C.

7. The curable hot melt composition according to claim 1, wherein component (A) is an organopolysiloxane represented by the average composition formula:

$R^1_a SiO_{(4-a)/2}$ wherein, 1e is independently a halogen-substituted or unsubstituted monovalent hydrocarbon group, with the proviso that 10 mol % or greater of all 1e is a phenyl group and at least two of 1e are alkenyl groups, and a is a number of 0.5 to 2.5.

8. The curable hot melt composition according to claim 7, wherein component (A) comprises (A-1) an organopolysiloxane represented by the average unit formula:

$(R^2_3 SiO_{1/2})_b (R^2_2 SiO_{2/2})_c (R^2 SiO_{3/2})_d (SiO_{4/2})_e (R_3 O_{1/2})_f$ wherein, $R^2$ are the same or different, halogen-substituted or unsubstituted monovalent hydrocarbon groups, $R^3$ is a hydrogen atom or an alkyl group, b is a number of 0 to 0.7, c is a number of 0 to 0.7, d is a number of 0 to 0.9, e is a number of 0 to 0.7, f is a number of 0 to 0.1, and d+e is a number of 0.3 to 0.9, and b+c+d+e is 1; and (A-2) an organopolysiloxane represented by the average unit formula:

$(R^4_3 SiO_{1/2})_g (R^4_2 SiO_{2/2})_h (R^4 SiO_{3/2})_i (SiO_{4/2})_j (R^5 O_{1/2})_k$ wherein, $R^4$ are the same or different, halogen-substituted or unsubstituted monovalent hydrocarbon groups, $R^5$ is a hydrogen atom or an alkyl group, g is a number of 0.01 to 0.3, h is a number of 0.4 to 0.99, i is a number of 0 to 0.2, j is a number of 0 to 0.2, k is a number of 0 to 0.1, and i+j is a number of 0 to 0.2, and g+h+i+j is 1;

wherein a mass ratio of component (A-1) : component (A-2) is from 50:50 to 100:0.

9. The curable hot melt composition according to claim 1, wherein component (B) is an organopolysiloxane represented by the average composition formula:

$R^6_l H_m SiO_{(4-l-m)/2}$ wherein, $R^6$ is a halogen-substituted or unsubstituted monovalent hydrocarbon group, l is a number of 1.0 to 2.5, m is a number of 0.01 to 0.9, and l+m is a number of 1.5 to 3.0.

* * * * *

UNITED STATES PATENT AND TRADEMARK OFFICE
CERTIFICATE OF CORRECTION

PATENT NO.         : 10,167,418 B2
APPLICATION NO.    : 15/320513
DATED              : January 1, 2019
INVENTOR(S)        : Haruna Yamazaki et al.

Page 1 of 1

It is certified that error appears in the above-identified patent and that said Letters Patent is hereby corrected as shown below:

On the Title Page

Item (73) Assignee:
"Dow Corning Co., Ltd."
Should read:
--Dow Corning Toray Co., Ltd.--

Signed and Sealed this
Twenty-fifth Day of June, 2019

Andrei Iancu
*Director of the United States Patent and Trademark Office*